(12) United States Patent
Tsai et al.

(10) Patent No.: US 8,779,382 B1
(45) Date of Patent: Jul. 15, 2014

(54) CORONA-WIRE UNIPOLAR AEROSOL CHARGER

(71) Applicant: National Chiao Tung University, Hsinchu (TW)

(72) Inventors: Chuen-Jinn Tsai, Zhubei (TW); Chih-Liang Chien, New Taipei (TW); Virat Wattanamekhinkul, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 13/896,043

(22) Filed: May 16, 2013

(51) Int. Cl.
*H01J 49/22* (2006.01)
*H01T 23/00* (2006.01)

(52) U.S. Cl.
USPC ............ 250/426; 250/306; 250/307; 209/210

(58) Field of Classification Search
USPC .......................... 250/306, 307, 426; 209/210
See application file for complete search history.

(56) References Cited

U.S. PATENT DOCUMENTS

| | | | |
|---|---|---|---|
| 5,247,842 A | 9/1993 | Kaufman et al. | |
| 5,973,904 A | 10/1999 | Pui et al. | |
| 6,093,557 A | 7/2000 | Pui et al. | |
| 6,905,029 B2 * | 6/2005 | Flagan | 209/210 |
| 7,883,558 B2 * | 2/2011 | Gottung et al. | 55/315 |
| 7,972,661 B2 | 7/2011 | Pui et al. | |
| 8,044,350 B2 | 10/2011 | Chen et al. | |
| 8,192,523 B1 * | 6/2012 | Kaufman et al. | 95/3 |
| 8,400,750 B2 * | 3/2013 | Tsai et al. | 361/230 |

OTHER PUBLICATIONS

Chen et al., "A high efficiency, high throughput unipolar aerosol charger for nanoparticles," Journal of Nanoparticle Research, 1, 1999, pp. 115-126.
Kruis et al., "Nanoparticle charging in a twin Hewitt charger," Journal of Nanoparticle Research, 3, 2001, pp. 39-50.
Hernandez-Sierra et al., "Unipolar charging of nanometer aerosol particles in a corona ionizer," Aerosol Science, 34, 2003, pp. 733-745.
Alonso et al., "The measurement of charging efficiencies and losses of aerosol nanoparticles in a corona charger," Journal of Electrostatics, 64, Jul. 19, 2005, pp. 203-214.
Qi et al., "Experimental study of a new corona-based unipolar aerosol charger," Aerosol Science, 38, 2007, pp. 775-792.
Kimoto et al., "A Small Mixing-Type Unipolar Charger (SMUC) for Nanparticles," Aerosol Science and Technology, 44, 2010, pp. 872-880.
Chien et al., "Modeling and Validation of Nanoparticle Charging Efficiency of a Single-Wire Corona Unipolar Charger," Aerosol Science and Technology, 45, 2011, pp. 1468-1479.

* cited by examiner

*Primary Examiner* — Phillip A Johnston
*Assistant Examiner* — Hsien Tsai
(74) *Attorney, Agent, or Firm* — Muncy, Geissler, Olds & Lowe, P.C.

(57) ABSTRACT

This invention relates to the reduction of charged particle loss by radially introducing sheath air from the porous wall. The corona-wire unipolar aerosol charger of the present invention includes a charging chamber, at least one aerosol inlet channel, a corona wire, an annular sheath air inlet opening, a porous tube defining a charging chamber, an annular sheath air outlet opening, and an aerosol outlet channel. The sheath air inlet opening is for radially introducing a sheath air flow into the charging chamber. The charged particles will not deposit on the wall surface of the charger if the radial velocity of the introduced sheath air at the wall is higher or comparable to the electrostatic velocity of charged particles. The dilution effect of charged particle due to the use of clean air can be further minimized by redirecting the excess clean air to the outside of the charger.

16 Claims, 9 Drawing Sheets

CORONA-WIRE UNIPOLAR AEROSOL CHARGER

BACKGROUND OF THE INVENTION

1. Field of the Invention

The present invention relates generally to an aerosol charger, and more specifically to a corona-wire unipolar aerosol charger.

2. Description of the Related Art

Nanoparticles possess many unique physical, chemical and biological properties which lead to their diverse applications. However, some of the same unique properties which make nanoparticles useful are also properties which may cause nanoparticles harmful to humans or the environment. Many parameters such as size, shape, density, surface characteristics and composition influence the behavior, fate, transport, and toxicity of nanoparticles. Among them, size is one of the most important parameters. Therefore, it is important to characterize the size of nanoparticles accurately.

The differential mobility analyzer (DMA) shows the greatest promise for accurate sizing and classification of nanoparticles. To operate the DMA, aerosol particles must first be charged electrically to a known charge distribution on which nanoparticles sizing and classifying is based. In electrical aerosol instruments, the most commonly used techniques for charging particles is diffusion charging. Diffusion charging of particles can be either unipolar or bipolar, depending on the polarity of the ions colliding with particles. In unipolar charging, ions of only one polarity are present, and particles increase their charge with time. In bipolar charging, both positive and negative ions are present, and particles will acquire charges with time by attachment of ions of the opposite polarity until they reach an equilibrium charge distribution. This process is also known as charge neutralization.

Bipolar diffusion chargers are commonly used with DMAs in scanning mobility particles sizers for the measurement of particle size distribution because of a well defined charge distribution. However, the charging efficiency for nanoparticles is low because both charging and neutralization mechanisms happen at the same time, which is only 0.7%-4% and 0.8%-5%, respectively, for positively and negatively charged particles of 2-10 nm in diameter. In other words, lots of nanoparticles would be wasted during the classification process. In addition, the extremely low nanoparticles charging efficiency of bipolar chargers could lead to low sensitivity in detecting nanoparticles with low concentration. Therefore, it is desirable to have high concentration of charged nanoparticles from the charger and before they are classified by the DMA.

Unipolar diffusion chargers provide higher charging efficiency than bipolar diffusion chargers because the recombination of charged particle with the ions of opposite polarity is avoided. To achieve high charging efficiency, various unipolar chargers were developed using a variety of techniques to generate ions for diffusion charging. Among these techniques, corona discharge can produce unipolar ions at a high enough concentration for efficient diffusion charging.

Numerous corona-based unipolar chargers were designed using either a wire or a needle as the discharge electrode. Some designs involved mixing ion jet flow with aerosol flow in the charging chamber without an external electric field to reduce charged particle loss. However, high efficiency charging is still difficult to obtain for nanoparticles smaller than 10 nm. Therefore, an aerosol charger with higher charging efficiency in this size range is needed to improve the sensitivity and accuracy of monitoring instruments for nanoparticles.

Some unipolar charger designs have an additional sheath air flow either near the wall of the charger to reduce charged particle loss or around the discharge wire to prevent accretion of particles in the charging chamber.

For example, U.S. Pat. No. 5,247,842, U.S. Pat. No. 6,093,557 and U.S. Pat. No. 7,972,661 disclose electrospray systems that are able to generate submicrometer droplets substantially uniform in size. A liquid sample is supplied at a controlled rate to a capillary needle of the system, and droplets are formed due to an electrical field in the region about the needle discharge. All of the three also disclose an introduction of sheath air flowing concentrically and axially about the capillary needle to guide the droplets downstream. However, such design does not help to reduce the charged particle loss of the system.

U.S. Pat. No. 5,973,904 discloses a unipolar charger utilizing a radioactive source of polonium. A confined electric field is applied within a charger housing and is parallel to the flow of a stream of aerosol particles. The design further uses a sheath air surrounding the aerosol flow to keep charged particles in the core region to minimize electrostatic loss. So far, this design has the highest extrinsic charging efficiency for particles smaller than 5 nm in diameter among all unipolar chargers. However, the issue of tight safety regulations on using radioactive sources remains, and the unipolar charger using radioactive sources required an electric field to separate the positive and negative ions is also referred to as a relatively complicated design. Moreover, the concentration of the charged particles is lowered at an outlet of the charger subject to the utilization of the sheath air.

U.S. Pat. No. 8,044,350 discloses a corona-needle unipolar charger consisting of two major components. The outer includes a radial inlet tube and axial outlet tube. The second is the corona discharge module, consisting of a pointed needle electrode placed coaxially in the outer tube capped with a perforate dome. The corona discharge module is installed in the case at the end opposite the axial exit tube. Although an axial sheath is introduced to avoid accumulation of charged particles on the corona needle, such design cannot mitigate the particle loss in the charger.

Chien et al. (2011) and U.S. Pat. No. 8,400,750 disclose a particle charger for enhancing the charging efficiency with a sheath air of high velocity introduced from an annular slit formed by a shroud and an outer casing to minimize charged particle loss. The numerical results of Chien et al. (2011) indicate that there are flow recirculation zones generated inside the charger due to the axial high velocity sheath air, and therefore the charged particles are restricted from rapidly leaving the charger.

SUMMARY OF THE INVENTION

It is a main objective of the present invention to provide a corona-wire unipolar aerosol charger with radial sheath air to minimize particle loss.

It is another main objective of the present invention to provide a corona-wire unipolar aerosol charger with minimized flow recirculation zones inside the charger to reduce charged particle loss.

To achieve the above and other objectives of the present invention, a corona-wire unipolar aerosol charger is provided. The corona-wire unipolar aerosol charger includes a charging chamber, at least one aerosol inlet channel, a corona wire, an annular sheath air inlet opening, a porous tube, an annular sheath air outlet opening, and an aerosol outlet channel. The aerosol inlet channel is in communication with the charging chamber for introducing an aerosol flow including a plurality of particles into the charging chamber. The corona wire is axially disposed on a central line of the charging chamber, and the corona wire is adapted to electrically connect to a high voltage direct current source and create a region of plasma for charging at least a part of the particles of the aerosol flow. Further, the corona wire has a leading edge adjacent to the aerosol inlet channel and a distal end. The sheath air inlet opening is in communication with the charging chamber for radially introducing a sheath air flow into the charging chamber. The sheath air inlet opening is radially corresponding to the corona wire. The porous tube is disposed about the corona wire and covers the sheath air inlet opening for the sheath air flow to pass therethrough. The annular sheath air outlet opening is in communication with the charging chamber for redirecting at least a part of the sheath air flow out off the charging chamber. The aerosol outlet channel is also in communication with the charging chamber for directing the aerosol flow with the charged particles out off the charging chamber. In which, the aerosol inlet channel, the sheath air inlet opening, the sheath air outlet opening and the aerosol outlet channel are sequentially arranged in an axial direction of the charging chamber.

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

DETAILED DESCRIPTION OF THE INVENTION

Figure 1:
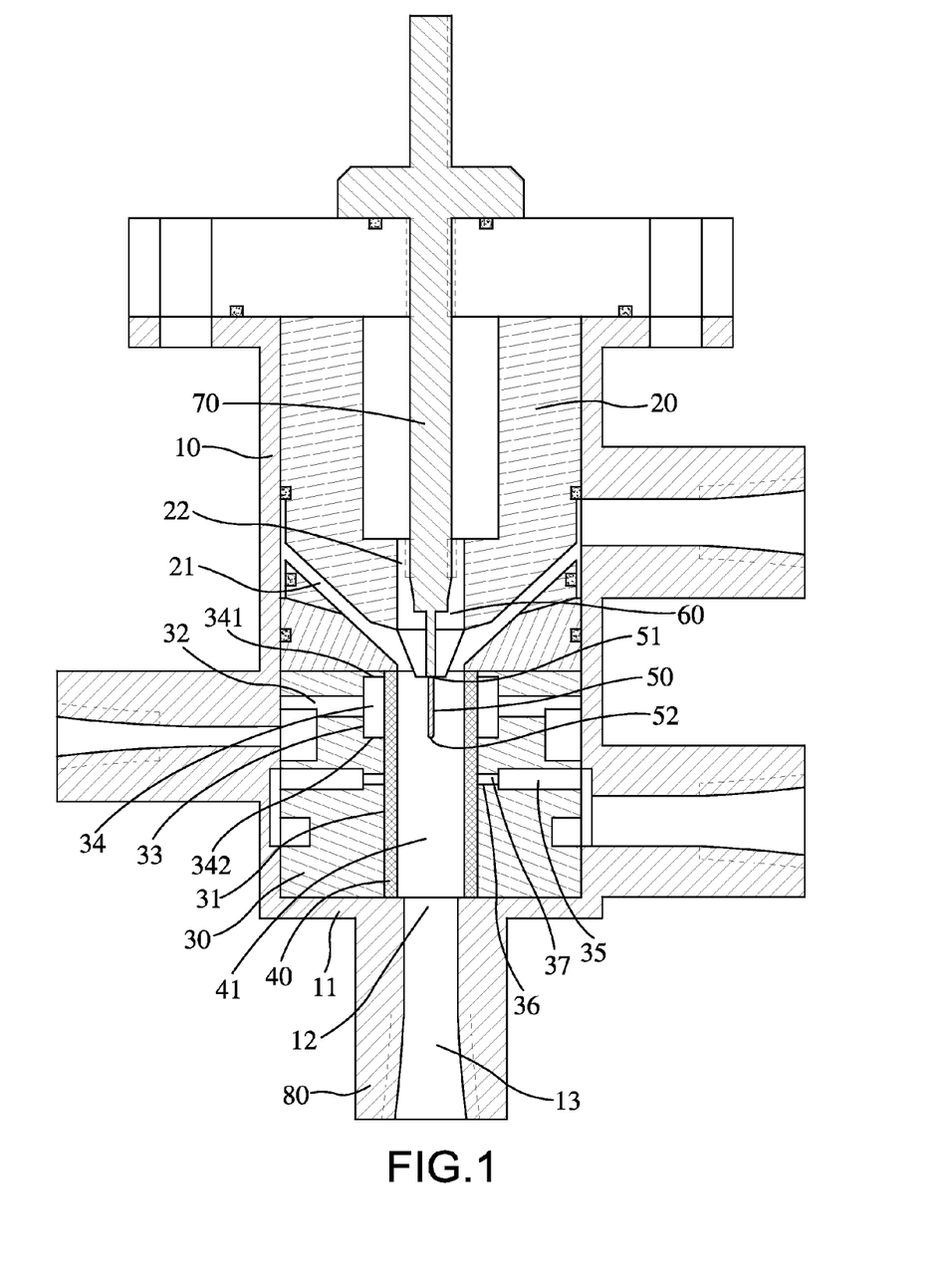
FIG. 1 is a profile of the aerosol charger of the first embodiment of the present invention.

Please refer to FIG. 1 for a corona-wire unipolar aerosol charger in accordance with the first embodiment of the present invention. The corona-wire unipolar aerosol charger includes a casing 10, an aerosol guide 20 disposed in the casing 10, a sheath air guiding sleeve 30 disposed in the casing 10, a porous tube 40 defining a charging chamber 41, a corona wire 50, an insulated socket 60 and a conductor 70.

The aerosol guide 20 defines therein at least one aerosol inlet channel 21, four of which are provided in the present embodiment. The aerosol inlet channels 21 are in communication with the charging chamber 41 for introducing an aerosol flow including a plurality of particles into the charging chamber 41. Each of the aerosol inlet channels 21 is made slanted with respect to an axial direction of the charging chamber 41, such that the channels 21 are adapted for guiding the aerosol flow into the charging chamber 41 at an angle of, preferably, 45 degrees with respect to the axial direction of the charging chamber 41.

The aerosol guide 20 further has a central bore 22 for disposition of the insulated socket 60, which is preferably made of light-weighted and non-conductive material, e.g. Teflon. The corona wire 50 is axially disposed on a central line of the charging chamber 41 and surrounded by the porous tube 40. The corona wire 50 is adapted to electrically connect to a high voltage direct current source and create a region of plasma for charging at least a part of the particles of the aerosol flow. The corona wire 50 has a leading edge 51 adjacent to the aerosol inlet channel 21 and a distal end 52. The conductor 70 is disposed in the insulated socket 60 and is in electrical connection with the high voltage direct current source and the corona wire 50. The corona wire 50 is attached to an end of the conductor 70 at the leading edge 51 thereof. The corona wire 50 and the conductor 70 are both made of conductive material, such as gold, silver, copper or platinum.

The sheath air guiding sleeve 30 has an inner wall 31 defining a through hole for disposition of the porous tube 40. The sheath air guiding sleeve 30 also has a sheath air inlet channel 32 and an annular inlet slit 33 formed on the inner wall 31. The annular inlet slit 33 defines a sheath air inlet opening 34, which is in communication with the charging chamber 41 and the sheath air inlet channel 32 for radially introducing a sheath air flow from the sheath air inlet channel 32 into the charging chamber 41, in which the sheath air inlet opening 34 is radially corresponding to the corona wire 50. In the present embodiment, the sheath air inlet opening 34 has an upstream end 341 radially aligning with the leading edge 51 of the corona wire 50, and a downstream end 342 radially aligning with the distal end 52 of the corona wire 50.

The sheath air guiding sleeve 30 further has a sheath air outlet channel 35 and an annular outlet slit 36 formed on the inner wall 31. The annular outlet slit 36 defines a sheath air outlet opening 37, which is in communication with the charging chamber 41 and the sheath air outlet channel 35 for redirecting at least a part of the sheath air flow out off the charging chamber 41. Furthermore, the porous tube 40 is arranged in the manner that the sheath air inlet opening 34 and the sheath air outlet opening 47 are both covered thereby for the sheath air to pass therethrough. Preferably, the sheath air flow is a stream of filtered air or filtered nitrogen.

The casing 10 has a bottom wall 11 which is formed with an opening 12, and an aerosol outlet tube 80 is disposed on the bottom wall 11. An aerosol outlet channel 13 is defined by the opening 12 and in the aerosol outlet tube 80, in which the aerosol outlet channel 13 is in communication with the charging chamber 41 for directing the aerosol flow with the charged particles out off the charging chamber 41.

The aerosol inlet channels 21, the sheath air inlet opening 34, the sheath air outlet opening 37 and the aerosol outlet channel 13 are sequentially arranged in the axial direction of the charging chamber 41.

At least one of the casing 10, the sheath air guiding sleeve 30 and the porous tube 40 is made of conductive material which can be grounded. In the present embodiment, the casing 10, the sheath air guiding sleeve 30 and the porous tube 40 are all made of metal, e.g. stainless steel, and thus all of them can be grounded in order to create a plasma region about the corona wire 50 when the corona wire 50 is powered.

Figure 2:
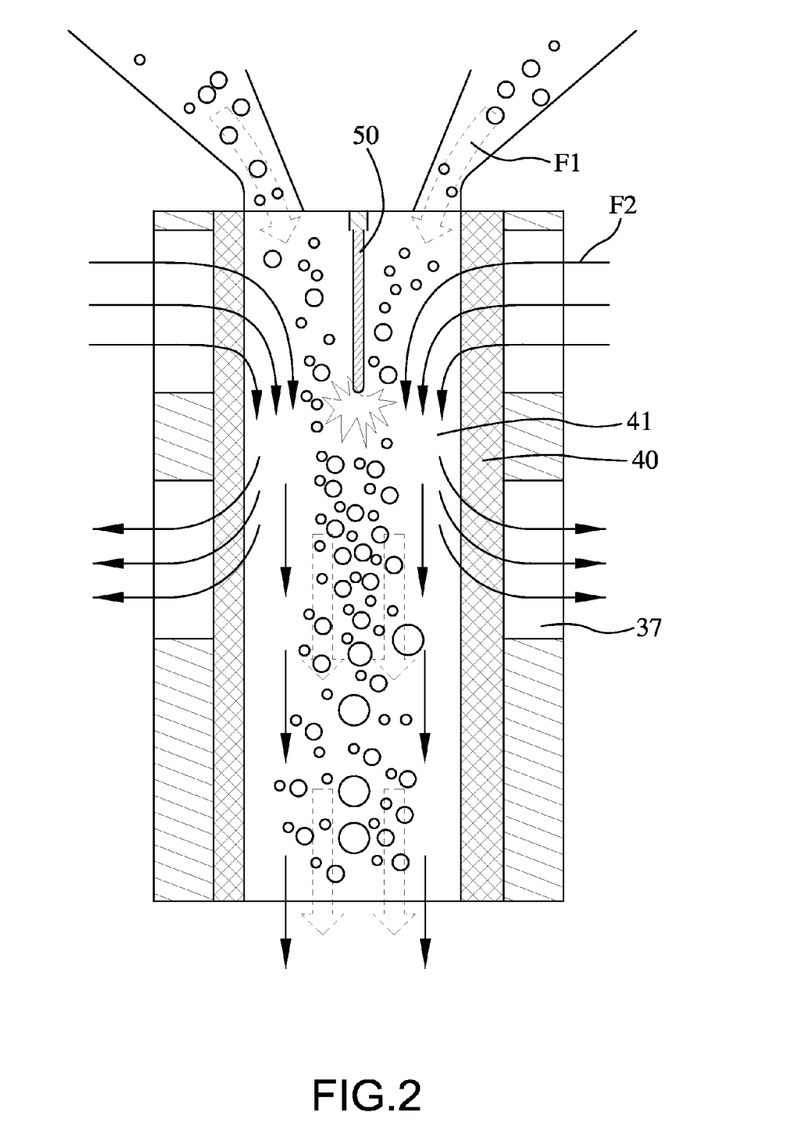
FIG. 2 is a profile showing the operation of the aerosol charger of the first embodiment of the present invention.

Please further refer to FIG. 2. When the aerosol flow F1 and the sheath air flow F2 are both introduced into the charging chamber 41 as the corona wire 50 is powered and creates a plasma region, at least a part of the particles passing through the plasma region can be charged. The radially introduced sheath air can push the aerosol flow F1 away from the inner wall of the porous tube 40 where charged particle loss would otherwise likely occur. A part of the sheath air then further redirected out off the charging chamber 41 via the sheath air outlet opening 37, such that the charged particle concentration of the aerosol flow F1 near the aerosol outlet channel can be maintained. Since the charged particle loss is reduced, a higher extrinsic charging efficiency of the aerosol charger can be expected.

Figure 3:
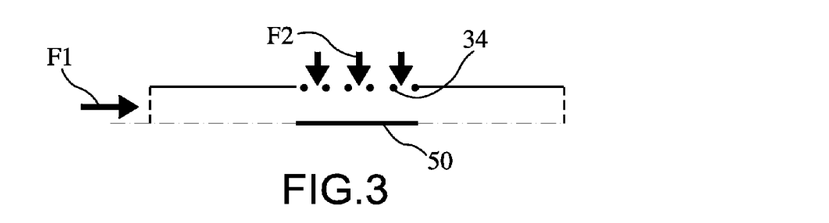
FIG. 3 is a drawing showing the calculation domain of a 2-D numerical simulation for evaluating the performance of the charger of the first embodiment of the present invention.

A 2-D numerical simulation was conducted to evaluate the performance of the charger of the present embodiment and determine the optimum operating condition. The calculation domain of 20 mm in length and 3.175 mm in width is shown in FIG. 3, in which the dotted lines represent the sheath air inlet opening 34, which is grounded, of 6 mm in length which is exactly equal to the length of the gold corona wire 50 of 50 µm in diameter.

The corona voltage with the corresponding corona current in the charger with radial sheath air was calculated by the wire-in-tube electrostatic precipitator (ESP) theory. The critical voltage, $V_c$, for the corona generation in the wire-in-tube ESP was calculated as:

$$V_c = E_b r_w \ln(r_t/r_w)$$

where $E_b = 3000 + 127 d_w^{-1/2}$ is the breakdown voltage (kV/m), $d_w$ is the diameter of the discharge wire (m), $r_1$ is the radius of the tube (m), $r_w$ is the radius of the discharge wire (m). The ion concentration, $N_i$, in the wire-in-tube ESP was estimated by the following equation:

$$N_i = I/eEZ_i A$$

where E is the electric field strength (V/m), $Z_i$ is ion mobility (m²/s·V), I is corona current (A), and A is the cross area of ions (m²). The corona voltage V is given by:

$$V = V_c + E_b r_w \left[ \sqrt{1+\theta} - 1 - \ln\left(\frac{1+\sqrt{1+\theta}}{2}\right) \right]$$

where θ is defined as:

$$\theta = \frac{I r_t^2}{2\pi\varepsilon_0 Z_i E_b^2 r_w^2}$$

where $\epsilon_0$ is permittivity of air (A·s/Volt·m).

Figure 4A:
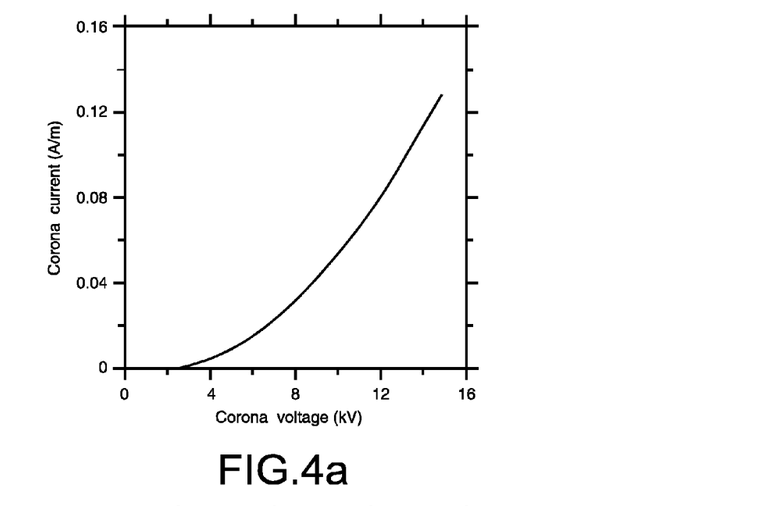
FIG. 4a is a chart showing the corona current versus the corona voltage in the wire-in-tube ESP of the first embodiment of the present invention.
Figure 4B:
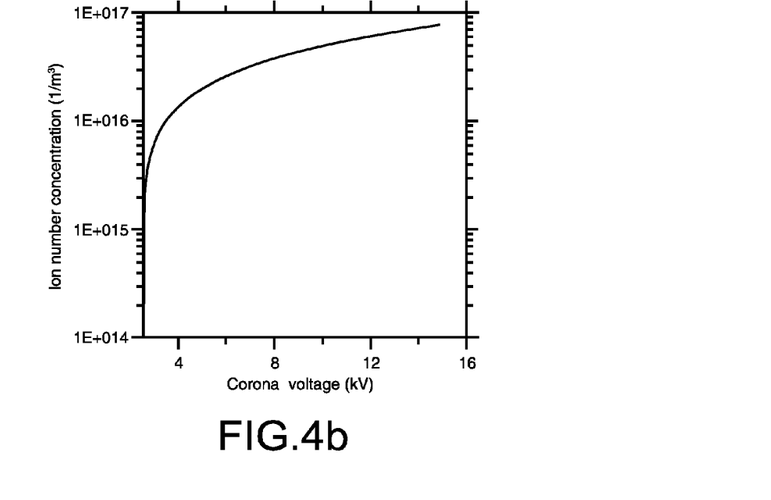
FIG. 4b is a chart showing the ion number concentration versus the corona voltage in the wire-in-tube ESP of the first embodiment of the present invention.

FIG. 4a shows the corona current as a function of the applied voltage in the wire-in-tube ESP of 6 mm in length and 6.35 mm in diameter with the wire diameter of 50 µm. The corona current varies from $1 \times 10^{-6}$ to $1.278 \times 10^{-1}$ A/m at the applied voltage of +2.5 to +14.8 kV. The ion concentration variation with the applied positive voltage is shown in FIG. 4b. When the applied voltage is increased from +2.5 to +14.8 kV, the ion concentration increases from $2.2 \times 10^{14}$ to $7.8 \times 10^{16}$ ions/m³. These theoretical corona voltage and current values are used for the simulation of the electric potential and ion concentration fields as shown below.

Figure 5A:
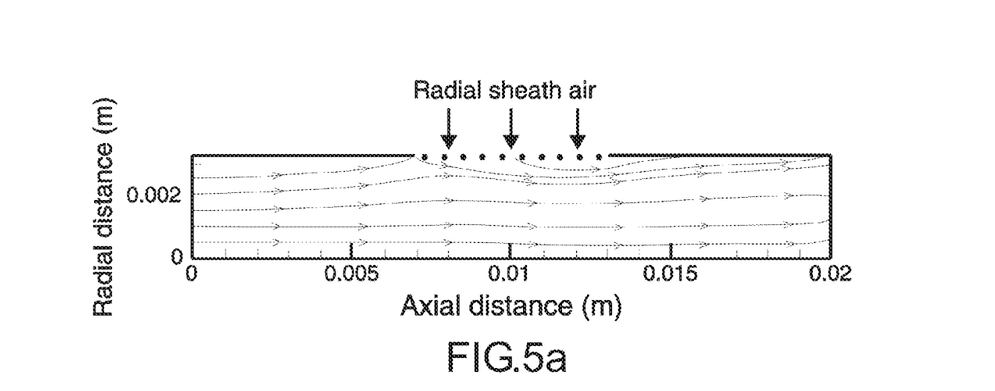
FIG. 5a is a chart showing the simulation of the flow streamlines of the first embodiment of the present invention at $Q_a$=1 L/min, $Q_{sh}$=0.7 L/min and applied voltage of +2.9 kV.
Figure 5B:
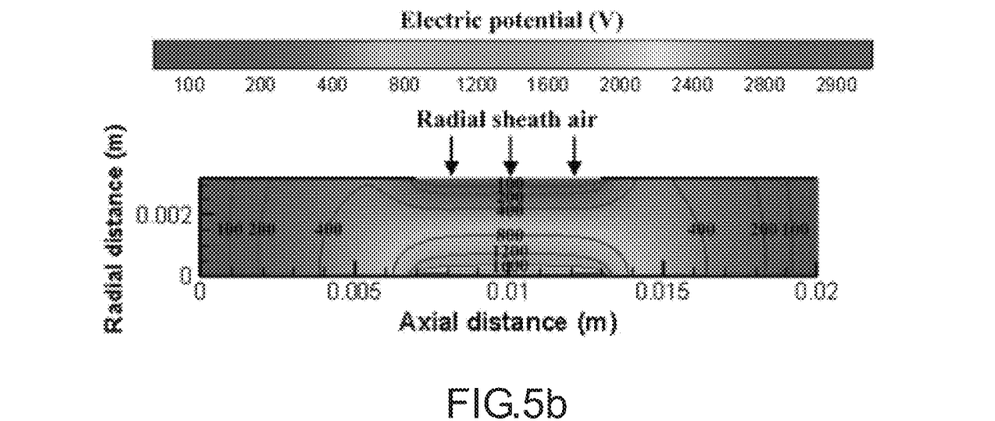
FIG. 5b is a chart showing the simulation of the electric potential field of the first embodiment of the present invention at $Q_a$=1 L/min, $Q_{sh}$=0.7 L/min and applied voltage of +2.9 kV.
Figure 5C:
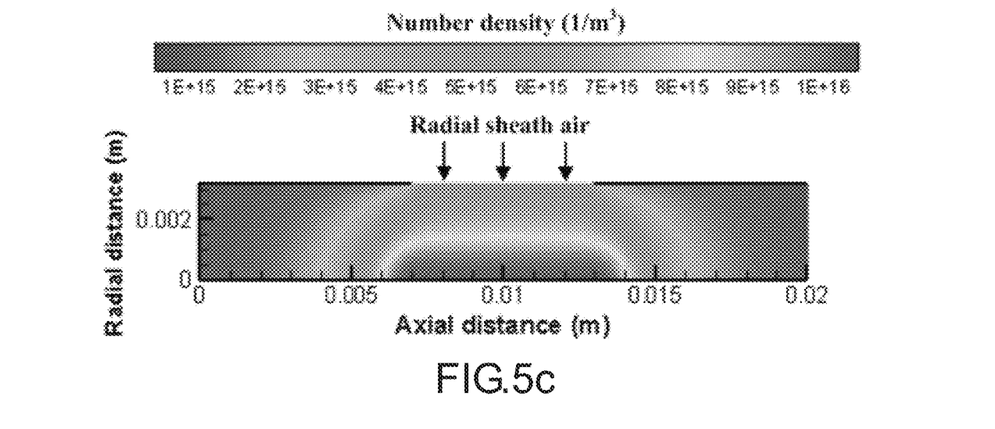
FIG. 5c is a chart showing the simulation of the ion number concentration field of the first embodiment of the present invention at $Q_a$=1 L/min, $Q_{sh}$=0.7 L/min and applied voltage of +2.9 kV.

The flow, electric potential, and ion concentration fields were calculated first before the charged particle concentration could be calculated. The simulation conditions for the present embodiment are: applied voltage=+2.9 kV, $Q_a$=0.5-1 L/min, and $Q_{sh}$=0-2.1 L/min, where $Q_a$ represents the flow rate of the aerosol flow, and $Q_{sh}$ represents the flow rate of the sheath air flow. An example of the calculated flow, electric potential, and ion number concentration fields at $Q_a$=1 L/min, $Q_{sh}$=0.7 L/min and applied voltage of +2.9 kV is shown in FIG. 5a, FIG. 5b and FIG. 5c respectively. With the use of radial sheath air, the streamlines associated with aerosol flow are pushed away from the wall of the charging zone where charged particle loss would otherwise likely occur. Therefore, the reduction of charged particle loss is expected. Both electric potential and ion concentration are seen to be the highest near the wire but decay from the wire rapidly. In FIG. 5c, the ion number concentration is also at its maximum at the wire surface.

Figure 6A:
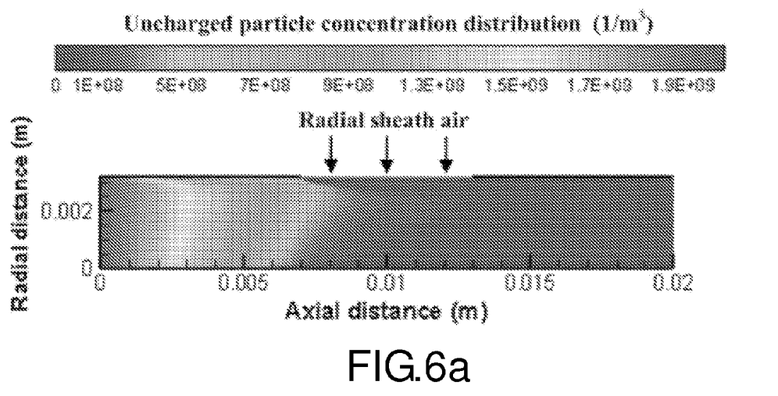
FIG. 6a is a chart showing the number concentration field of 20 nm particles carrying 0 charge in the first embodiment of the present invention at $Q_a$=1 L/min, $Q_{sh}$=0.7 L/min and applied voltage of +2.9 kV.
Figure 6B:
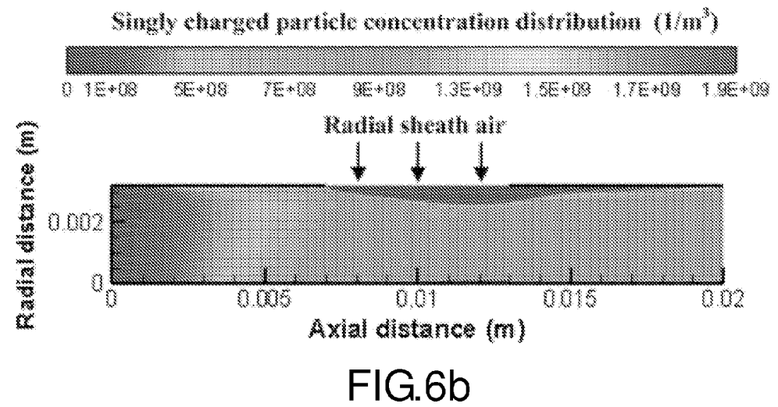
FIG. 6b is a chart showing the number concentration field of 20 nm particles carrying 1 charge in the first embodiment of the present invention at $Q_a$=1 L/min, $Q_{sh}$=0.7 L/min and applied voltage of +2.9 kV.
Figure 6C:
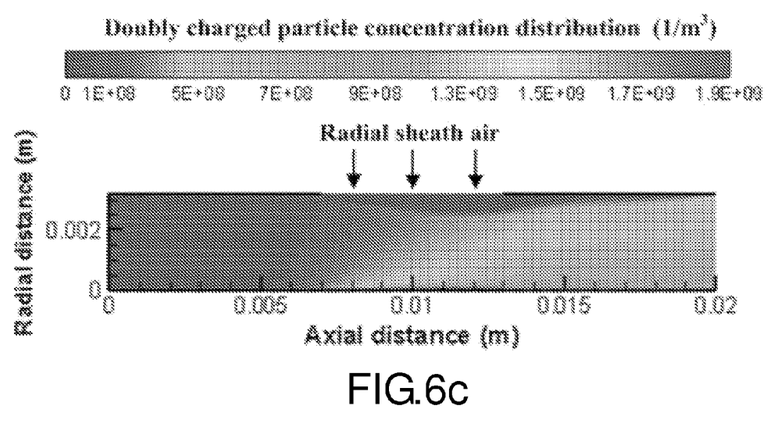
FIG. 6c is a chart showing the number concentration field of 20 nm particles carrying 2 charges in the first embodiment of the present invention at $Q_a$=1 L/min, $Q_{sh}$=0.7 L/min and applied voltage of +2.9 kV.

On the basis of the flow, electric potential, and ion concentration fields, the spatial distribution of charged particles was calculated. An example for 20 nm particles carrying 0-2 charges in the present embodiment at the applied voltage of +2.9 kV, $Q_a$=1 L/min, and $Q_{sh}$=0.7 L/min is shown in FIG. 6a, FIG. 6b and FIG. 6c respectively. The ion molecular weight and the inlet particle concentration were assumed to be 0.109 kg/mol and $2\times10^9$ particles/$m^3$ in the simulation, respectively. The concentration of particles with 0 charge decreases with an increasing axial distance from the entrance of the charger, where some particles are charged to 1-2 charges. With the use of radial sheath air, the charged particles migrating toward the wall are seen to be pushed toward the core of the tube and the electrostatic loss is reduced.

As shown in the aforesaid simulations, no flow recirculation region for aerosol flow is observed near the wall of the charging zone of the charger with radial sheath air, and zero deposition region of charged particles is observed near the wall surface on the downstream side, i.e. the right-hand-side of the figure, of the sheath air inlet opening. Nevertheless, the ion concentration also exists in the region before the leading edge of the wire where particle charging also takes place, and charged particle deposition on the wall would likely occur without the protection of radial sheath air flow.

Figure 7:
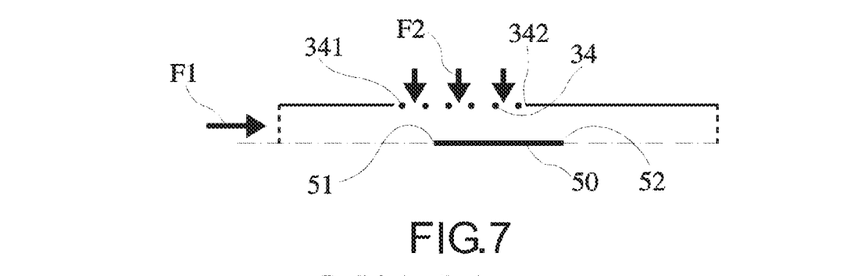
FIG. 7 is a drawing showing the calculation domain of a 2-D numerical simulation for evaluating the performance of the charger of the second embodiment of the present invention.

Therefore, a further modified aerosol charger is provided as the second embodiment of the present invention. Please refer to FIG. 7, the sheath air inlet opening 34 is shifted 2 mm more upstream toward the left of the leading edge 51 of the wire 50. In other words, the sheath air inlet opening 34 has an upstream end 341 located more upstream toward the aerosol inlet channel 21 than the leading edge 341 of the corona wire 50 in the axial direction, and the sheath air inlet opening 34 further has a downstream end 342 located between the leading edge 51 and the distal end 52 of the corona wire 50 in the axial direction.

Figure 8A:
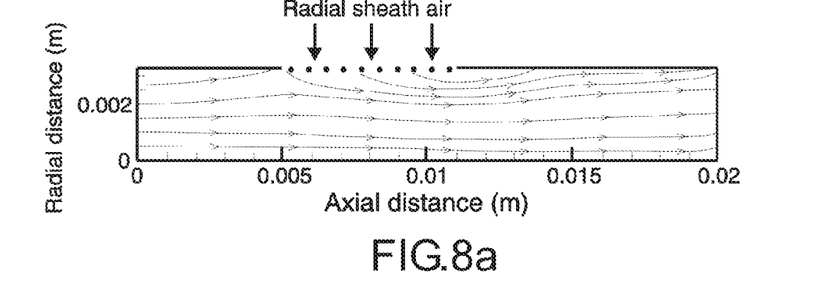
FIG. 8a is a chart showing the simulation of the flow streamlines of the second embodiment of the present invention at $Q_a$=0.5 L/min, $Q_{sh}$=0.7 L/min and applied voltage of +3.5 kV.
Figure 8B:
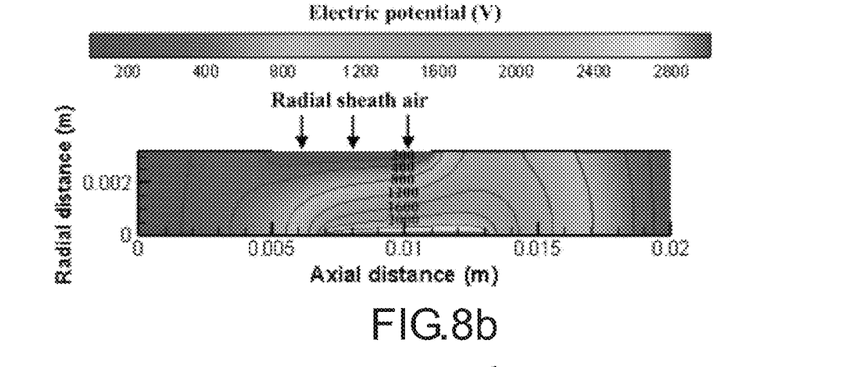
FIG. 8b is a chart showing the simulation of the electric potential field of the second embodiment of the present invention at $Q_a$=0.5 L/min, $Q_{sh}$=0.7 L/min and applied voltage of +3.5 kV.
Figure 8C:
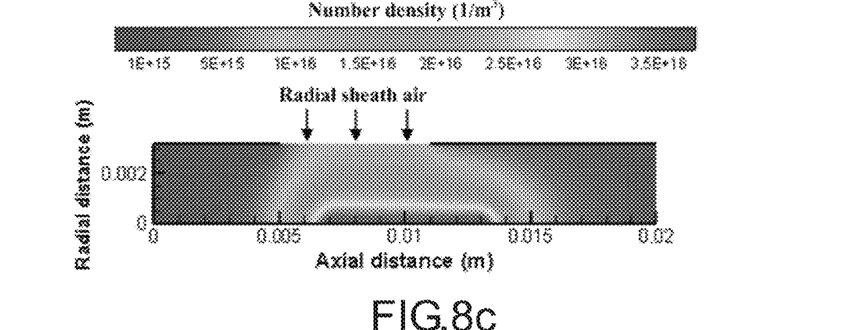
FIG. 8c is a chart showing the simulation of the ion number concentration field of the second embodiment of the present invention at $Q_a$=0.5 L/min, $Q_{sh}$=0.7 L/min and applied voltage of +3.5 kV.

At the same applied voltage and flow rates, the pattern of the flow field of the second embodiment is different from the first embodiment, while patterns of the electric potential and ion concentration fields of the second embodiment are similar (not shown). An example for the flow, electric potential, and ion number concentration fields in the second embodiment at the applied voltage of +3.5 kV, $Q_a$=0.5 L/min, and $Q_{sh}$=0.7 L/min is shown in FIG. 8a, FIG. 8b and FIG. 8c respectively. When shifting the sheath air inlet opening 2 mm more upstream, the effective region of inward radial sheath air where aerosol flow are pushed away from the wall is seen to be also extended to the upstream side, where charged particle loss would otherwise occur. Compared to the patterns shown in FIG. 5b and FIG. 5c, with an increasing corona voltage from +2.9 to +3.5 kV, both electric field strength and ion concentration are increased, which will lead to a higher intrinsic charging efficiency.

Figure 9A:
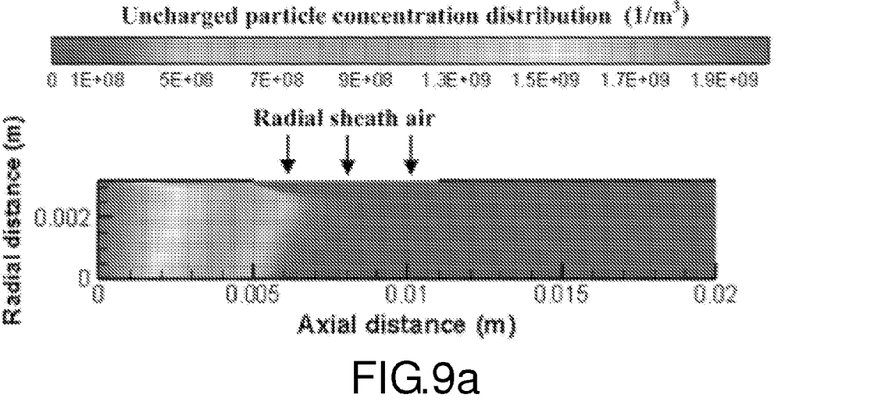
FIG. 9a is a chart showing the number concentration field of 20 nm particles carrying 0 charge in the second embodiment of the present invention at $Q_a$=1 L/min, $Q_{sh}$=0.7 L/min and applied voltage of +3.5 kV.
Figure 9B:
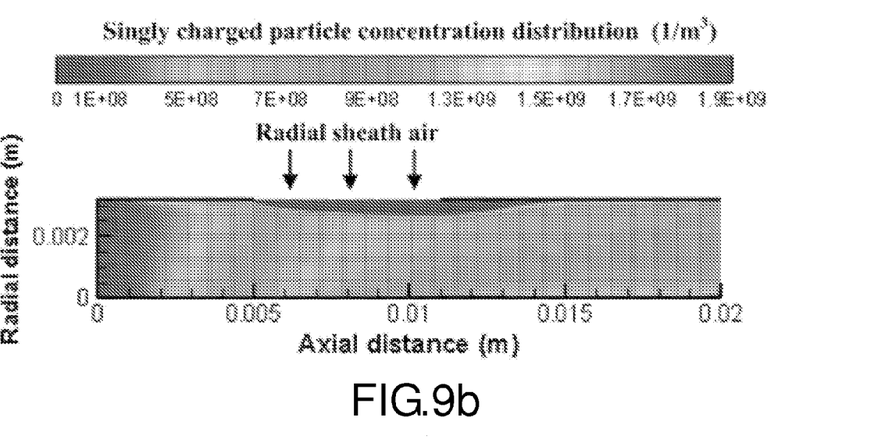
FIG. 9b is a chart showing the number concentration field of 20 nm particles carrying 1 charge in the second embodiment of the present invention at Q=1 L/min, $Q_{sh}$=0.7 L/min and applied voltage of +3.5 kV.
Figure 9C:
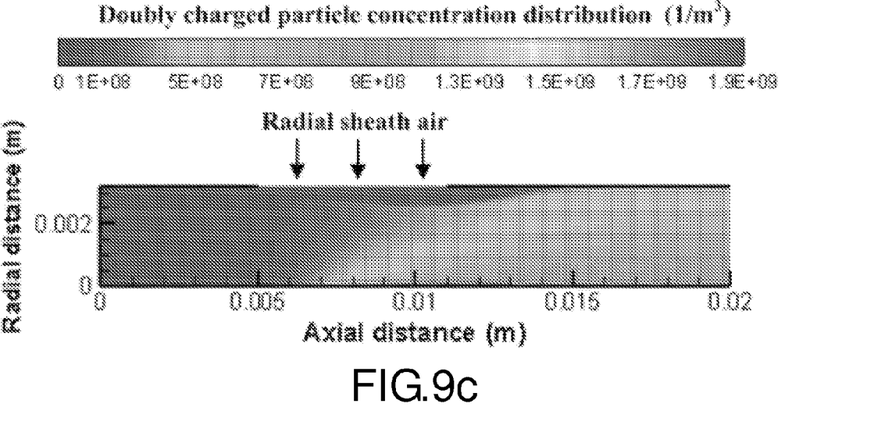
FIG. 9c is a chart showing the number concentration field of 20 nm particles carrying 2 charges in the second embodiment of the present invention at $Q_a$=1 L/min, $Q_{sh}$=0.7 L/min and applied voltage of +3.5 kV.

The simulated number concentration field of 20 nm particles carrying 0-2 charges in the second embodiment at the applied voltage of +3.5 kV, $Q_a$=0.5 L/min, and $Q_{sh}$=0.7 L/min is shown in FIG. 9a, FIG. 9b and FIG. 9c respectively. Compared to the pattern of the charged particle concentration field shown in FIG. 6b and FIG. 6c, with increasing corona voltage from +2.9 to +3.5 kV and decreasing aerosol flow rate from 1 to 0.5 L/min, the starting position in axial direction where particles acquire charge was found to shift toward the left. Zero deposition region of charged particles was also extended 2 mm to the left, meaning more effective reduction of charged particle loss. That is, the second embodiment will have less electrostatic loss, given the same operating condition, than the first embodiment because of its smaller deposition region of charged particles.

Figure 10A:
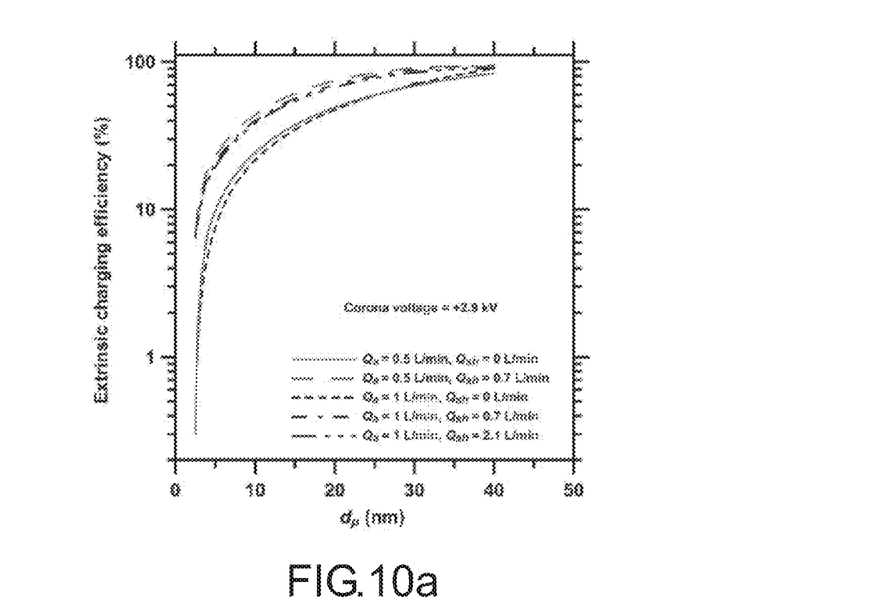
FIG. 10a is a chart showing the predicted extrinsic charging efficiency of the first embodiment at different aerosol and sheath air flow rates at the corona voltage of +2.9 kV.

In practical applications, the extrinsic charging efficiency is the most important index of the performance of the unipolar charger. The predicted extrinsic charging efficiency is shown in FIG. 10a for the first embodiment at different aerosol and sheath air flow rates at the applied voltage of +2.9 kV. In general, the extrinsic charging efficiency of the first embodiment increases with decreasing $Q_a$ from 1 to 0.5 L/min at the applied voltage of +2.9 kV. At a given aerosol flow rate, the extrinsic charging efficiency increases with increasing $Q_{sh}$ from 0 to 0.7 L/min due to the reduction of charged particle loss. For example, the extrinsic charging efficiency of the first embodiment for particles with particle diameter ($d_p$) of 2.5-40 nm increases from 0.6%-83.7% to 7.2%-92.2% and from 0.8%-90.1% to 6.8%-94.5% at $Q_a$=0.5 and 1 L/min, respectively, when $Q_{sh}$ is increased from 0 to 0.7 L/min at the applied voltage of +2.9 kV. At $Q_a$=1 L/min, further increase of $Q_{sh}$ from 0.7 to 2.1 L/min does not increase the extrinsic charging efficiency any further. The extrinsic charging efficiency is 6.6%-90.6% at $Q_{sh}$=2.1 L/min, which is very close to that of $Q_{sh}$=0.7 L/min. This is because that electrostatic loss in the charger is effectively reduced at $Q_{sh}$=0.7 L/min but does not change very much at $Q_{sh}$=2.1 L/min. These results also show that both aerosol and sheath air flow rates can be adjusted to maximize the extrinsic charging efficiency.

At the applied voltage of +2.9 kV, the first embodiment operating at $Q_a$=0.5 L/min and $Q_{sh}$=0.7 L/min shows the highest extrinsic charging efficiency among different flow rate combinations, but not high enough for particles smaller than 10 nm in diameter. It is therefore necessary to change the design to achieve a higher extrinsic efficiency while keeping charged particle loss as small as possible. This is the intended purpose of the second embodiment.

Figure 10B:
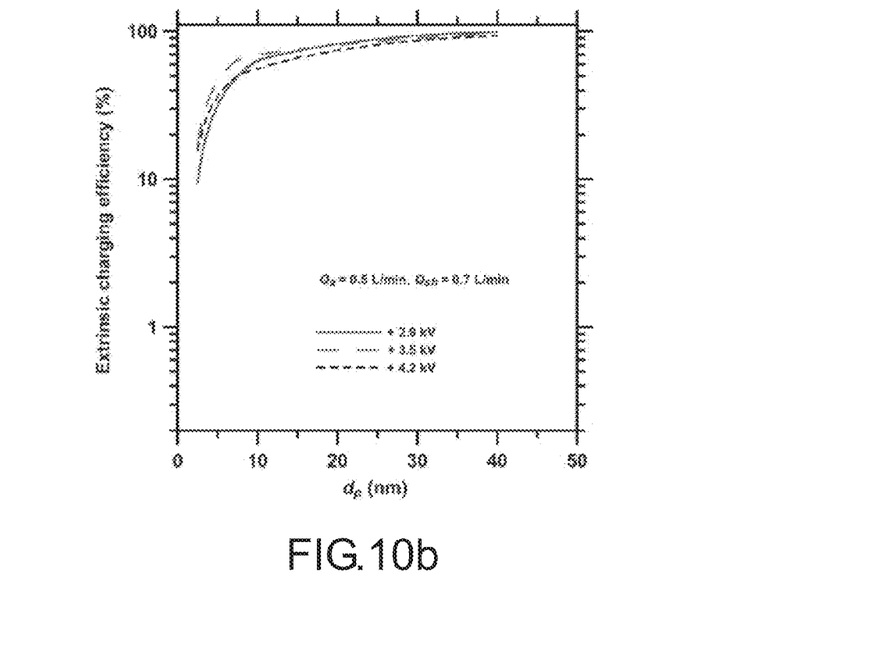
FIG. 10b is a chart showing the predicted extrinsic charging efficiency of the second embodiment at different corona voltages.

FIG. 10b shows the predicted extrinsic charging efficiency as a function of particle diameter for the second embodiment at different applied voltages. At the same operating condition, the performance of the second embodiment is slightly higher than the first embodiment over the simulated particle size range. The extrinsic charging efficiency of the second embodiment is 9.7%-99.0% ($d_p$=2.5-40 nm) at the applied voltage of +2.9 kV, $Q_a$=0.5 L/min, and $Q_{sh}$=0.7 L/min, but the improvement is still limited for the charging efficiency of particles smaller than 10 nm in diameter. But if the applied voltage is increased from +2.9 to +3.5 kV, the extrinsic charging efficiency of the second embodiment is increased substantially to 17.2%-70.5% for particles with $d_p$=2.5-10 nm, while it is slightly decreased to 78.1%-97.0% for particles with $d_p$=20-40 nm. Further increase in the applied voltage from +3.5 to +4.2 kV results in the decrease in the extrinsic charging efficiency to 15.8%-93.6% ($d_p$=2.5-40 nm) due to increasing charged particle loss. Thus under a proper operating condition, the maximum extrinsic charging efficiency for particles smaller than 10 nm in diameter of the second embodiment can be achieved.

Figure 11:
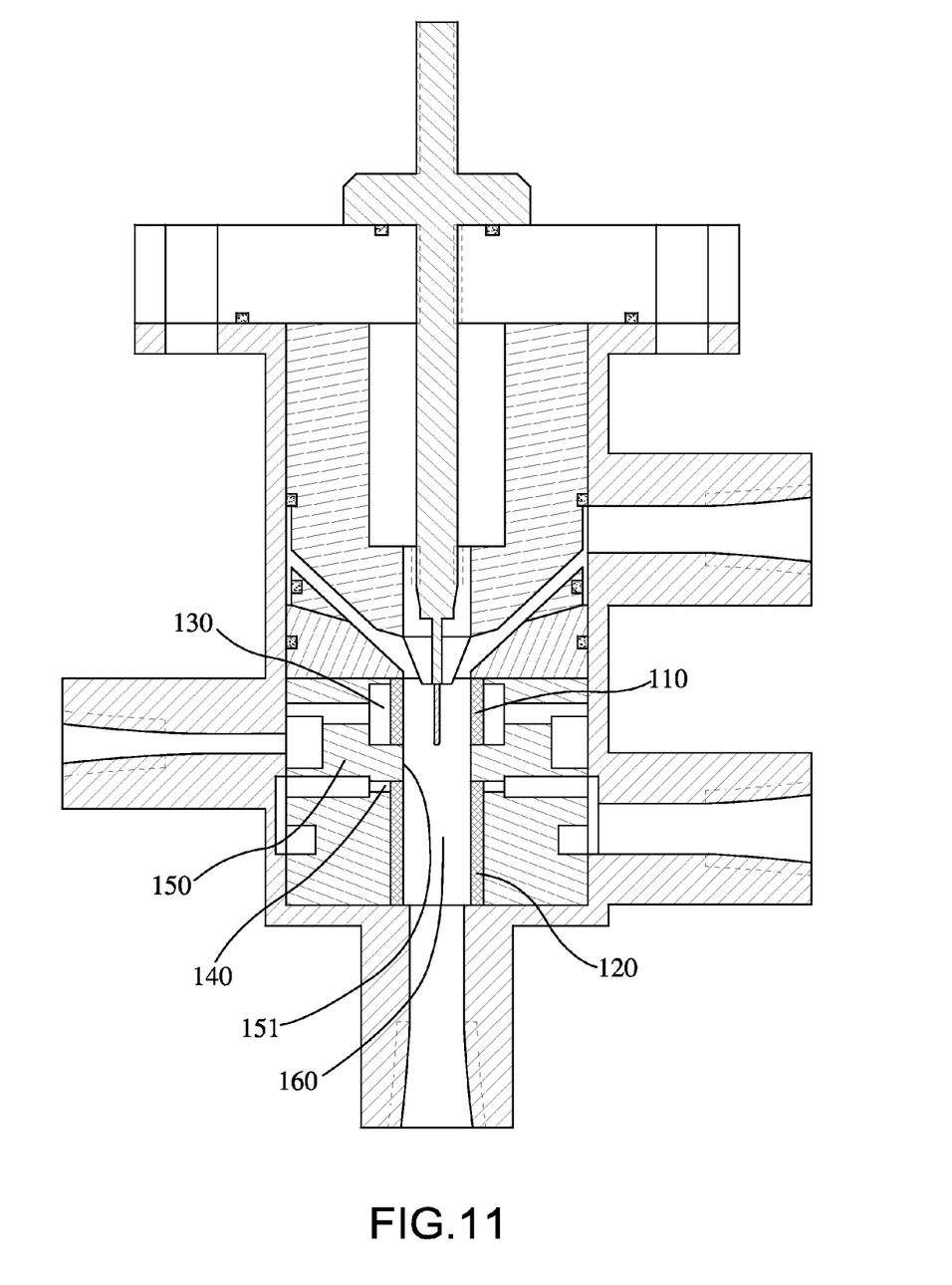
FIG. 11 is a profile of the aerosol charger of the third embodiment of the present invention.

The structure of the aerosol charger can still be further modified. For example, as shown in FIG. 11, two porous tubes 110, 120 are used to cover the sheath air inlet opening 130 and the sheath air outlet opening 140 respectively. The porous tubes 110, 120 are align with an inner surface 151 of the sheath air guiding sleeve 150, in which the charging chamber 160 is defined by the porous tubes 110, 120 and the inner surface 151 of the sheath air guiding sleeve 150. In this embodiment, the sheath air guiding sleeve 150 can also be made of non-conductive material, e.g. Teflon, with a conductive layer coated on the inner surface 151.

In light of foregoing, sheath air is found to have a considerable effect on reducing the loss of charged particles, especially when the sheath air is introduced from the radial direction into the charging chamber. Compared to the conventional charger with axial sheath air, no flow recirculation region for aerosol flow is observed near the wall of the charging zone of the charger with radial sheath air. For the effect of the position of the sheath air inlet opening, the second embodiment of the present invention has less electrostatic loss than the first one because of its smaller deposition region of charged particles at the same operating condition. These results show the advantage of using radial sheath air with an appropriate position of the sheath air inlet opening to minimize charged particle loss and to elevate extrinsic charging efficiency.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A corona-wire unipolar aerosol charger, comprising:
   a charging chamber;
   at least one aerosol inlet channel in communication with the charging chamber for introducing an aerosol flow comprising a plurality of particles into the charging chamber;
   a corona wire, axially disposed on a central line of the charging chamber, the corona wire being adapted to electrically connect to a high voltage direct current source and create a region of plasma for charging at least a part of the particles of the aerosol flow, the corona wire having a leading edge adjacent to the aerosol inlet channel and a distal end;
   an annular sheath air inlet opening in communication with the charging chamber for radially introducing a sheath air flow into the charging chamber, the sheath air inlet opening being radially corresponding to the corona wire;
   a porous tube, disposed about the corona wire and covering the sheath air inlet opening for the sheath air flow to pass therethrough;
   an annual sheath air outlet opening in communication with the charging chamber for redirecting at least a part of the sheath air flow out off the charging chamber; and
   an aerosol outlet channel in communication with the charging chamber for directing the aerosol flow with the charged particles out off the charging chamber;
   wherein the aerosol inlet channel, the sheath air inlet opening, the sheath air outlet opening and the aerosol outlet channel are sequentially arranged in an axial direction of the charging chamber, and
   wherein the aerosol inlet channel is adapted for guiding the aerosol flow into the charging chamber at an angle of 45 degrees with respect to the axial direction of the charging chamber.

2. The corona-wire unipolar aerosol charger of claim 1, wherein the charging chamber is defined by the porous tube, and the porous tube further covers the sheath air outlet opening for the sheath air flow to pass therethrough.

3. The corona-wire unipolar aerosol charger of claim 2, further comprising a casing, an aerosol guide disposed in the casing, and a sheath air guiding sleeve disposed in the casing, the aerosol inlet channel being defined in the aerosol guide, the sheath air guiding sleeve having an inner wall defining a through hole for disposition of the porous tube, the sheath air guiding sleeve further having a sheath air inlet channel and an annular inlet slit formed on the inner wall and defining the sheath air inlet opening, the sheath air inlet opening being in communication with the sheath air inlet channel, the sheath air guiding sleeve further having a sheath air outlet channel and an annular outlet slit formed on the inner wall and defining the sheath air outlet opening, the sheath air outlet opening being in communication with the sheath air outlet channel.

4. The corona-wire unipolar aerosol charger of claim 3, further comprising an insulated socket and a conductor disposed in the insulated socket, the aerosol guide having a central bore for disposition of the insulated socket, the conductor being in electrical connection with the high voltage direct current source and the corona wire, the corona wire being attached to an end of the conductor.

5. The corona-wire unipolar aerosol charger of claim 1, wherein the sheath air inlet opening has an upstream end radially aligning with the leading edge of the corona wire, and a downstream end radially aligning with the distal end of the corona wire.

6. The corona-wire unipolar aerosol charger of claim 1, wherein the sheath air inlet opening has an upstream end located more upstream toward the aerosol inlet channel than the leading edge of the corona wire in the axial direction, the sheath air inlet opening further has a downstream end located between the leading edge and the distal end of the corona wire in the axial direction.

7. The corona-wire unipolar aerosol charger of claim 1, wherein the sheath air flow is a stream of filtered air or filtered nitrogen.

8. The corona-wire unipolar aerosol charger of claim 3, wherein the casing is made of metal.

9. The corona wire unipolar aerosol charger of claim 8, wherein the casing is made of stainless steel.

10. The corona wire unipolar aerosol charger of claim 3, wherein the sheath air guiding sleeve is made of metal.

11. The corona wire unipolar aerosol charger of claim 10, wherein the sheath air guiding sleeve is made of stainless steel.

12. The corona wire unipolar aerosol charger of claim 1, wherein the porous tube is made of metal.

13. The corona wire unipolar aerosol charger of claim 12, wherein the porous tube is made of stainless steel.

14. The corona wire unipolar aerosol charger of claim 4, wherein the conductor is made of sliver or copper.

15. The corona wire unipolar aerosol charger of claim 4, wherein the insulated socket is made of Teflon.

16. The corona wire unipolar aerosol charger of claim 1, wherein the corona wire is made of gold, silver, copper or platinum.

* * * * *